United States Patent [19]

Kodric

[11] Patent Number: 4,496,283
[45] Date of Patent: Jan. 29, 1985

[54] WIND TURBINE

[76] Inventor: Andrej A. Kodric, 340 Dixon Rd., Apt. #1808, Weston, Ontario, Canada, M9R 1T1

[21] Appl. No.: 594,462

[22] Filed: Mar. 26, 1984

Related U.S. Application Data

[63] Continuation-in-part of Ser. No. 470,915, Mar. 1, 1983, abandoned.

[51] Int. Cl.³ .............................................. F03D 7/06
[52] U.S. Cl. ...................................... 416/44; 416/119
[58] Field of Search ............................... 416/117–119, 416/41 R, 44 A

[56] References Cited

U.S. PATENT DOCUMENTS

| | | | |
|---|---|---|---|
| 498,068 | 5/1893 | Lonning | 416/119 X |
| 505,736 | 9/1893 | Walker | 416/119 X |
| 662,737 | 11/1900 | Puszkar | 416/118 |
| 745,945 | 12/1903 | Williams | 416/117 X |
| 766,801 | 8/1904 | Allen | 416/117 |
| 1,198,410 | 9/1916 | Bjornson | 416/119 |
| 1,413,339 | 4/1922 | Leimi | 416/118 |
| 1,794,930 | 3/1931 | Spencer | 416/119 |
| 2,247,929 | 7/1941 | Terhune | 416/139 A X |
| 4,346,305 | 8/1982 | White | 290/55 |

FOREIGN PATENT DOCUMENTS

| | | | |
|---|---|---|---|
| 3918 | 2/1879 | Fed. Rep. of Germany | 416/119 |
| 571577 | 5/1924 | France | 416/119 |
| 2392249 | 1/1979 | France | 416/119 |
| 8663 | 4/1896 | Sweden | 416/119 |
| 13700 | of 1903 | United Kingdom | 416/119 |
| 1508796 | 4/1978 | United Kingdom | 416/119 |

Primary Examiner—Everette A. Powell, Jr.
Attorney, Agent, or Firm—Ridout & Maybee

[57] ABSTRACT

The invention provides a wind turbine rotatable about a vertical axis comprising a plurality of planar vanes each situated along the height of a vertical shaft at a separate level. Adjacent vanes are staggered at the same dihedral angle to one another. Each vane has a plurality of doors which pivot between an open and closed position. Auxiliary panels are provided above and below each set of doors to channel the flow of air along the vane thus increasing the power derivable from the wind. Automatic release means for the doors may be provided to prevent structural damage under high wind conditions.

17 Claims, 6 Drawing Figures

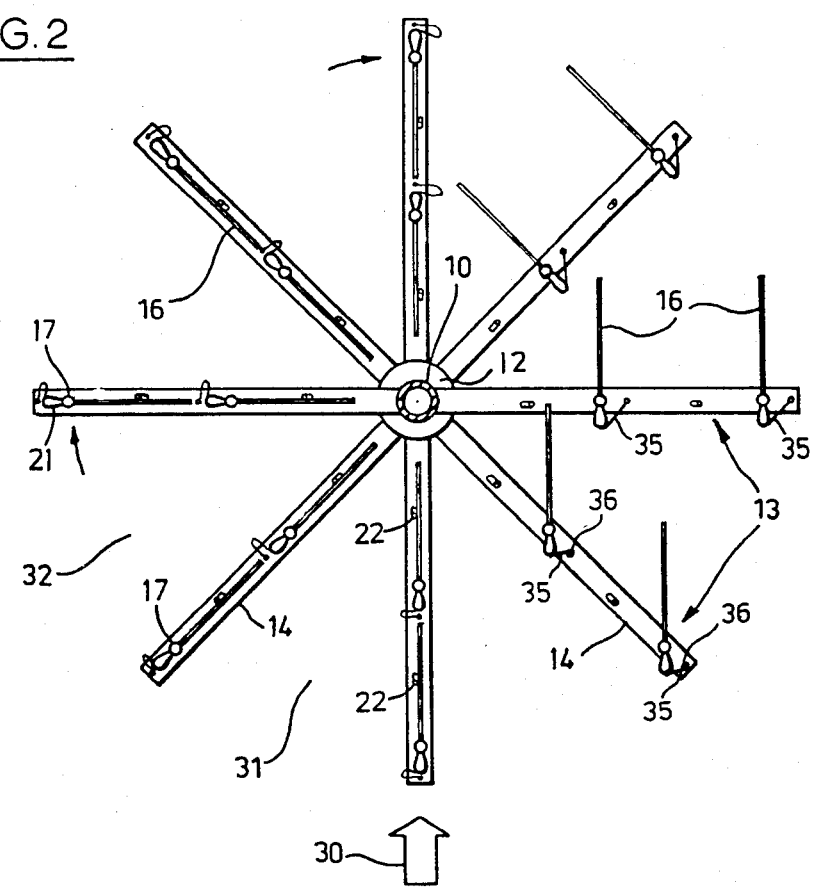

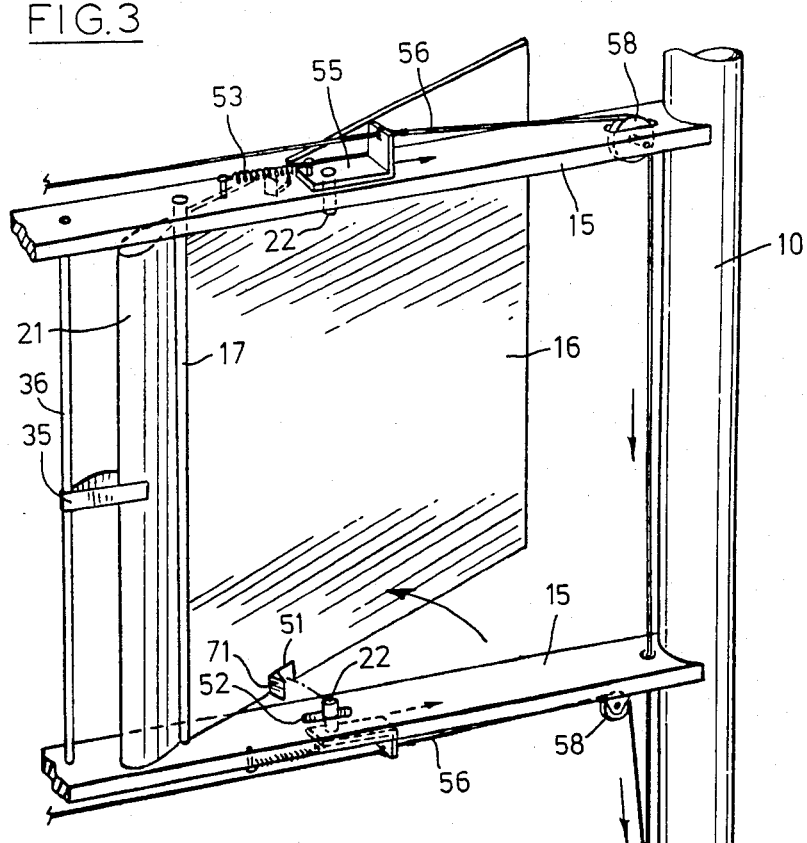
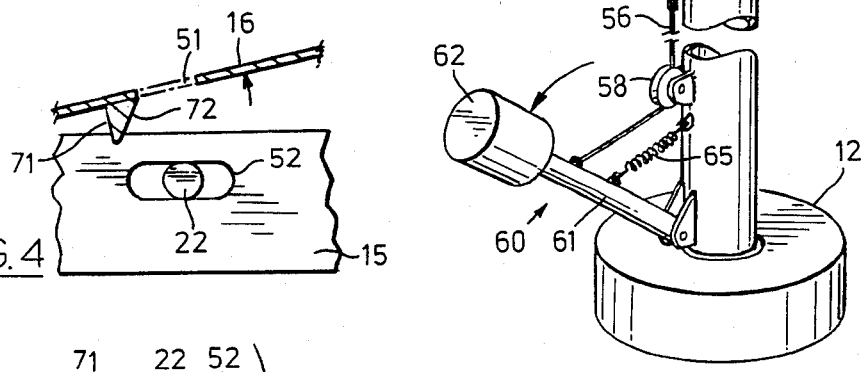

WIND TURBINE

This application is a continuation-in-part of U.S. patent application Ser. No. 470,915 filed Mar. 1, 1983, now abandoned.

The present invention relates to a wind turbine rotatable about a vertical axis, and having a number of features designed to increase the efficiency of energy utilization without adding unreasonably to the cost of manufacture thereof.

While wind turbines of various designs have been known for a long time, the present invention provides a highly efficient utilization of wind power through a new and improved device having vanes disposed individually along a vertical shaft rather than all at one level. A principal disadvantage of prior windmills of the horizontal type is that by having the vanes thereof situated at the same level of a vertical shaft, the full force of the wind cannot act on any single vane. Rather as the shaft rotates, a subsequent vane in the direction of rotation shields its predecessor as it moves into position to catch the wind.

In addition to this individual positioning of the vanes, the present invention includes the use of pivotal doors in the vanes which open to greatly decrease wind resistance to that portion of each vane moving against the wind. These doors are preferably provided with counterweights for smooth operation thereof, and have spring means to provide resistance to opening beyond about 45°.

The invention includes the use of hinged auxiliary panels above and below the doors on each vane to increase the effective area of the wing of each vane as it pivots about the shaft to catch the wind, the auxiliary panels moving to a neutral wind position as the vane pivots against the wind.

A number of optional features may also be included in the structure of the present wind turbine. For example, means may be provided for releasing the doors on the downwind stroke of the vanes when the rotation of the turbine reaches a threshhold speed beyond which damage to the turbine may occur. Also variation of the size of the vanes along the height of the vertical axis or shaft may be desirable in certain applications.

Accordingly, the present invention provides a wind turbine comprising a vertical shaft which is rotatable about its longitudinal axis, and a plurality of vanes attached to the shaft for capturing the force of the wind thereby imparting rotation to the shaft. Each vane comprises two wings disposed planarly opposite one another about the shaft, and each wing has at least an upper and a lower substantially horizontal arm. Each vane is situated along the height of the shaft at a separate level so as not to overlap any other vane. Adjacent vanes are disposed along the shaft at the same dihedral angle to one another in a staggered fashion. A plurality of doors are pivotally attached to each wing, and each door has a counterweight. The doors are each biased by spring means to provide resistance to opening beyond approximately 45°. Means are provided on each wing coacting with each door for preventing movement of the door in one direction so that each door may pivot between a closed and an open position in response to the force of the wind. A pair of auxiliary panels are pivotally attached to each wing with one panel being attached to the upper arm and the other panel being attached to the lower arm thereof. The auxiliary panels have means for restricting movement thereof beyond about 45° from the horizontal. The panels cooperate with the doors to capture the force of the wind as each wing moves with the wind, and the panels also cooperate with the doors to minimize resistance to the force of the wind as each wing moves against the wind.

A preferred embodiment of the present invention will now be described with reference to the drawings in which:

FIG. 2 is an overhead diagrammatic view of four vanes without auxiliary panels connected to a shaft at staggered dihedral angles of 45°;

FIG. 3 is a perspective view of the details of construction of a door on a wing, and showing a preferred automatic release means for said door;

FIGS. 4 and 5 are plan views of a detail showing the operation of the release means.

Figure 1:
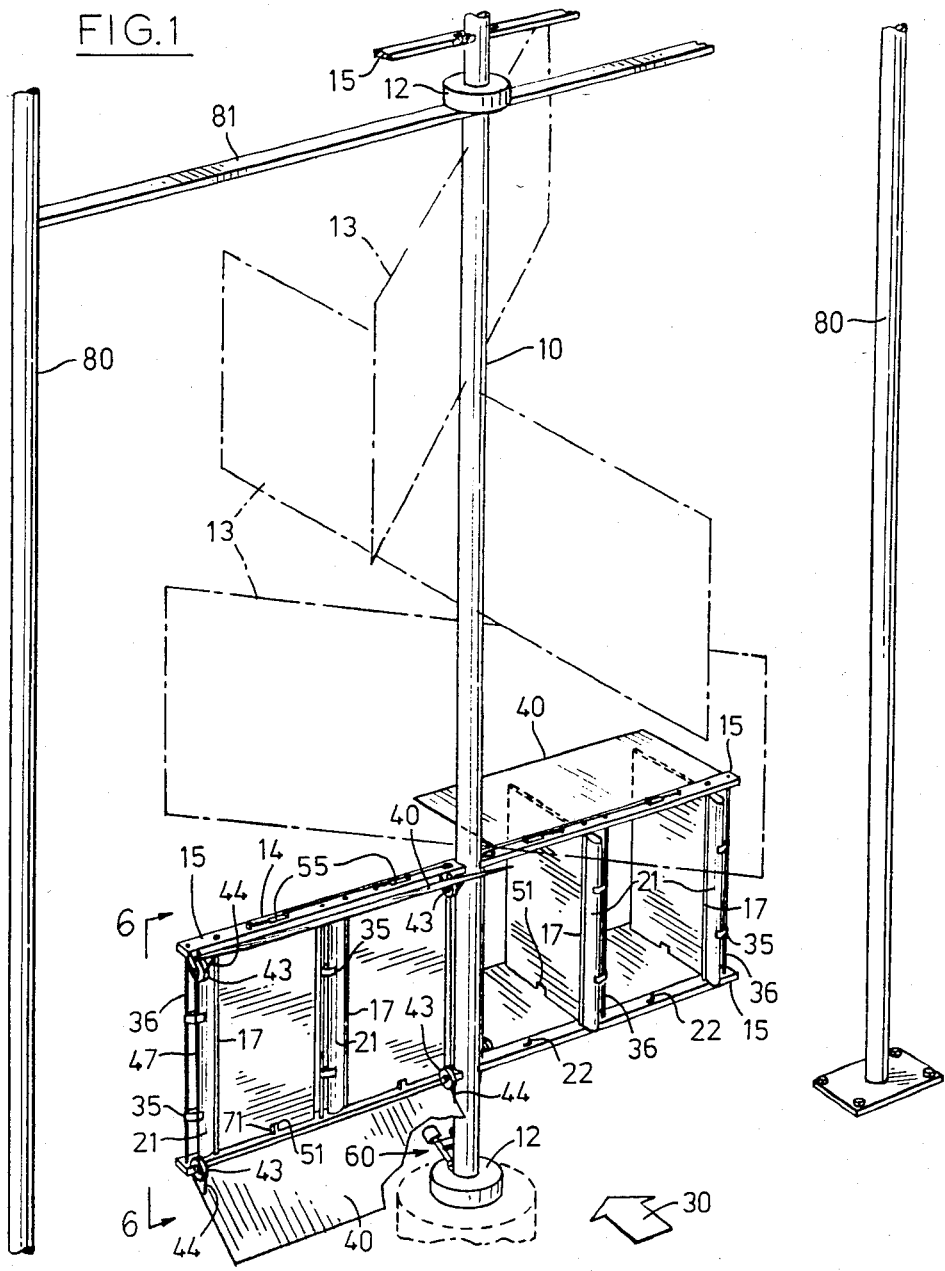
FIG. 1 is a perspective view of a portion of the invention showing details of one vane as connected to a vertical shaft.

Referring to FIG. 1, a vertical shaft 10 is journalled in bearings 12 and vanes 13 are connected to the shaft 10 at separate levels along its height. The vanes 13 are staggered at dihedral angles to one another, which angles may conveniently be 45° between adjacent vanes 13 (see FIG. 2). Each vane 13 comprises two wings 14 which are of equal dimensions and disposed planarly opposite one another in relation to the shaft 10. Each wing 14 comprises upper and lower substantially horizontal arms 15 and is provided with a plurality of doors 16 which are pivotally attached thereto. While there are a number of ways in which the doors 16 may be so attached to the wings 14, a preferred manner as shown in FIG. 1 is to mount the doors 16 about a vertical axis 17. As seen in FIG. 3, the vertical axis 17 may be a shaft. The weight of the door 16 is balanced by a counterweight 21 attached about the axis 17 oppositely of the door 16. Pivotal movement of the door 16 is restricted by pins 22 (FIG. 3) in the arms 15 of the wing 14, thus allowing the doors 16 to move between a closed and open position in response to the force of the wind.

The doors 16 may be made of a solid rigid material such as sheet metal or plastic. However, in applications where it is desirable or necessary to minimize the weight of the wings 14, the doors 16 may be constructed of a fabric. Clearly, the fabric must be of a close weave or coated so as to efficiently catch the wind.

Referring again to FIGS. 1 and 2, the operation of the wings 14 of the vanes 13 can be appreciated. With the wind blowing in the direction of the arrow 30, the doors 16 butt up against the pins 22 to allow the left hand wing 14 to catch the wind thereby causing rotation of the shaft 10 in a clockwise direction. The right hand wing 14 moves against the direction of the wind and the doors 16 of that wing 14, not being inhibited by the pins 22, pivot to an open position to provide a greatly reduced resistance to the movement of that wing 14.

The arrangement of the vanes 13 at discrete levels along the height of the shaft 10 allows each vane 13 to utilize the maximum available power from the wind. That is, as soon as the vane 13 moves around from the position in alignment with the wind, the wing 14 having closed doors 16 will be continually capturing the power of the wind until the shaft 10 has rotated 180° to place the vane 13 once again in a neutral position. Since the two neutral positions of the vane 13 which occur on each revolution of the shaft 10 are of extremely short duration relative to the duration of each cycle, each vane 13 is operating to capture the maximum possible force of the impinging wind. This is to be contrasted with the situation wherein a number of vanes are disposed about a shaft at the same level on that shaft. As may be appreciated from a consideration of FIG. 2 as illustrating such an arrangement when viewed overhead, the force of the wind shown by the arrow 30 can only interact with a wing 14 in an unimpeded manner in the 45° region 31. In the 45° region 32, the subsequent or following wing 14 screens the wind almost completely from the wing 14 positioned at a right angle to the wind direction 30. Clearly, the wind will have little or no driving effect on the wing 14 past this latter right angle position until it moves fully 270° about the shaft 10.

In addition to the foregoing, the vanes of the present wind turbine incorporate two additional features designed to increase the efficiency thereof without adding greatly to the cost of manufacture. As seen in FIGS. 1, 2 and 3, the doors 16 are biased by spring means 35 which preferably extend from a support rod 36 to the counterweight 21. The spring means 35 may be an elastomeric band in the case of use with relatively small doors 16, or the spring means 35 may be of more rugged construction such as a metal spring when used with relatively large doors 16. Also a plurality of such individual spring means 35 may be used in association with each door 16.

The purpose of the spring means 35 is to bias the door 16 toward the closed position as the door 16 swings open beyond about 45°. The maximum extension of the spring means 35 allows the door 16 to open to about 90°. Thus, the spring means 35 acts to bias the door 16 toward the closed position when the door is opened between about 45° and 90°. The effect that the spring means 35 has on the efficiency of the turbine can be appreciated from a consideration of FIG. 2. As each wing 14 moves against the wind 30, causing the doors 16 to open, the spring means 35 restricts the extent to which the doors 16 may open, thus allowing the doors 16 to catch additional wind in the quadrant from the twelve o'clock position to the three o'clock position of the cycle. The capture of wind force in this quadrant of rotation is akin to the wind force component utilized by a sailboat when tacking into the wind. Additionally, the spring means 36 provides a positive force component to vane 13 as the wing 14 rotates beyond the three o'clock position to that point where the doors 16 on the wing 14 are open only about 45°.

From the foregoing, it should be appreciated that the design of the present wind turbine including the spring means 35 as described provides additional utilization of energy derived from the wind for causing the turbine to rotate as desired. In accordance with this structure, energy is imparted to each vane through approximately seven-eighths of each cycle since a positive force component is utilized as the vane 13 moves against the wind direction 30.

The vanes 13 of the wind turbine are also provided with auxiliary panels 40 (FIG. 1) attached to the horizontal arms 15 of each wing 14 so that the panels 40 can pivot away from one another as the wing 14 moves with the wind 30 so as to catch the wind, and so that the panels 40 can pivot toward one another to a wind neutral position, being approximately horizontal, as the wing 14 moves against the wind. The size of the auxiliary panels 40 can be varied to suit the requirements of any particular turbine, and the degree to which the panels 40 are allowed to open so as to catch additional wind is governed by restriction means 41 which may be a device as is more particularly illustrated in FIG. 6.

Figure 6:
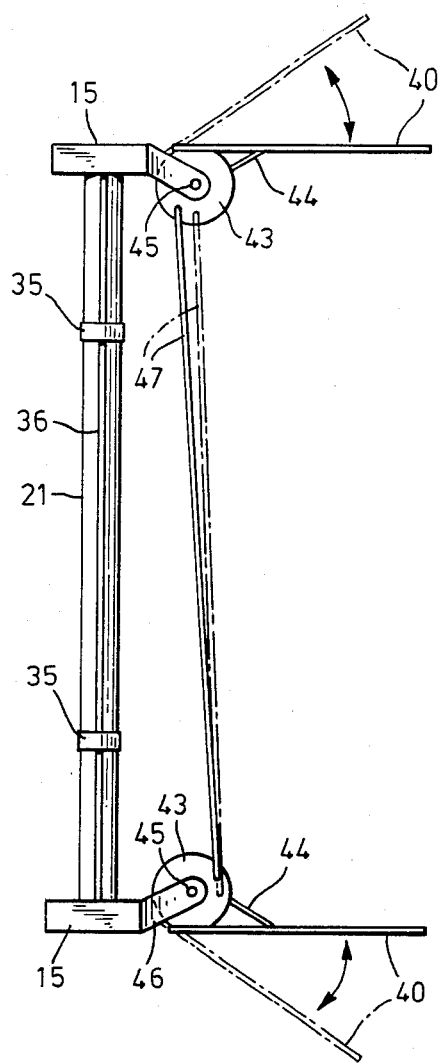
FIG. 6 is a view along line 6—6 in FIG. 1 showing a detail of the means for restricting the pivotal movement of the auxiliary panels.

From FIG. 6 each panel 40 is tangentially attached to a wheel 43 by means of an arm 44 extending from the wheel 43 to the panel 40. Each wheel 43 is rotatable about an axle 45 in a bracket 46 attached to one of the horizontal arms 15. The degree to which each panel 40 can pivot beyond horizontal is governed by a cable or arm 47 connected between oppositely disposed wheels 43. Preferably, the panels 40 should not exceed in width about one quarter the height of the doors 16 about which they are attached. Also, the range of pivotal motion of the panels 40 is preferred to be 5°–45° from the horizontal. Generally, for relatively small turbines the panels 40 should pivot only slightly from horizontal, however with a large wind turbine the panels 40 may open up to about 45° in order to achieve the best utilization of wind energy.

The purpose of the auxiliary panels 40 is to take advantage of the gradient in air pressure encountered along the length of a wing 14 which is moving with the wind. Under such conditions the air pressure on the wing will be greatest toward the shaft 10 and lowest at the outer edge of the wing 14 away from the shaft 10. The accessory panels 40 serve to retain the air captured by the closed doors 16 from escaping upwardly and downwardly off of the wing 14 and to channel the air flow along the length of the wing 14 from the area near the shaft 10 of high pressure toward the end of the wing 14 where the pressure is lower, thereby increasing significantly the power transferred to the wing 14 from the wind 30.

While clearly not essential to the function of the present wind turbine, it is generally desirable to provide means for releasing the closed doors 16 on the wings 14 under conditions of high wind forces where otherwise structural damage to the turbine might result. One such automatic release means for the doors 16 is shown in FIGS. 3, 4 and 5.

The preferred release means for the doors 16 comprises a notch 51 in each door 16 through which the retaining pin 22 can pass, and a slot 52 in the arm 15 about the pin 22 to allow the pin 22 to be moved between a door retaining and releasing position. The pin 22 is normally biased by spring means 53 toward the door retaining position. The spring means 53 is attached at one end of a bracket 55 which carries the pin 22, and a cable 56 is attached to the other end of the bracket 56 for the purpose of moving the pin 22 in the slot 52 counter to the force of the spring means 53 so as to release the door 16.

The release system may be automated by connecting the cable 56 through pulleys 58 to a centrifugal means 60 attached to the shaft 10. The centrifugal means 60 illustrated in FIG. 3 comprises a lever 61 pivotally attached at one end to the shaft 10, the lever 61 having a weight 62 attached to the other end thereof. The lever 61 is biased toward the shaft 10 by spring means 65, and the cable 56 attached to the various brackets 55 is connected to the lever 61. Depending on the particular construction of the turbine, there may be a plurality of centrifugal means 60 located along the shaft.

The centrifugal means 60 operates to release the doors 16 when the speed of rotation of the shaft 10 reaches a threshhold rate causing the weighted lever 61 to overcome the force of the spring means 65 and the various spring means 53 associated with the brackets 55 thereby allowing the lever 61 to move outwardly away from the shaft 10 pulling the cable 56 and causing the pins 22 to slide in the slots 52 to the notches 51 releasing the doors 16.

As the speed of rotation of the turbine is reduced, the spring means 65 and 53 overcome the centrifugal force exerted by the weighted lever 61, and the lever 61 is pulled back toward the shaft 10 thus allowing the pins 22 to slide in the slots 52 back to the door retaining position. The doors 16 are reset by providing a resetting structure 71 adjacent each notch 51 on the doors 16, which resetting structure 71 comprises a surface 72 projecting at an angle from the plane of the door, which surface 72 engages the pin 22 and guides it through the notch 51 as the door swings back toward the arms 15 of the wing 14 (see FIGS. 4 and 5).

It will be clear to the reader skilled in the art that the particulars regarding the various spring forces, pulleys and the weight 62 for the automatic release means herein described will be a matter of design governed by the size, configuration and local wind conditions associated with any particular wind turbine constructed in accordance with the invention.

While the foregoing represents the application of the basic principles of the invention to a preferred structure, there are a number of additions or variations which may be apparent to the reader skilled in the art. For example, it will be desirable in most cases to provide additional structural elements to the shaft 10 and vanes 13 for stability. Thus, vertical structural members 80 can be connected to a horizontal member 81 attached through a bearing 12 to the shaft 10 as shown in FIG. 1. It is felt that two such structural reinforcements would usually be desirably deployed at right angles to one another.

Regarding the structure of the vanes 13, guy wires can be provided from the shaft 10 to the arms 15 for added strength. Also, the vanes 13 need not be of equal size. Due to differences in wind velocity along the height of the shaft 10, it may be desirable to make vanes 13 having a larger surface area for use on the upper portion of the shaft 10.

While the foregoing has described a preferred embodiment of the invention as well as several desirable additional or alternate features thereof, it should be understood that the present invention covers all structures employing the basic principles and features thereof as defined in the following claims.

I claim:

1. A wind turbine comprising:
   a vertical shaft being rotatable about its longitudinal axis;
   a plurality of vanes attached to the shaft for capturing the force of the wind thereby imparting rotation to the shaft, each vane comprising two wings disposed planarly opposite one another about the shaft, each wing having at least an upper and a lower substantially horizontal arm, each vane being situated along the height of the shaft at a separate level so as not to overlap any other vane, and adjacent vanes being disposed along the shaft at the same dihedral angle to one another in a staggered fashion;
   a plurality of doors pivotally attached to each wing, each door having a counterweight, and each door being biased by spring means to provide resistance to opening beyond approximately 45°;
   means on each wing coacting with each door for preventing movement thereof in one direction so that each door may pivot between a closed and an open position in response to the force of the wind; and
   a pair of auxiliary panels pivotally attached to each wing, one panel being attached to the upper arm and the other panel being attached to the lower arm of each wing, the panels having means for restricting movement thereof beyond about 45° from the horizontal, said panels cooperating with the doors to capture the force of the wind as each wing moves with the wind, and said panels cooperating with the doors to minimize resistance to the force of the wind as each wing moves against the wind.

2. A wind turbine as claimed in claim 1, wherein the vanes have a larger surface area toward the top of the shaft as compared to the vanes toward the bottom of the shaft.

3. A wind turbine as claimed in claim 1, wherein the counterweight substantially balances the weight of the door about the pivotal attachment thereof to the wing.

4. A wind turbine as claimed in claim 1, wherein the spring means is at least one metal spring.

5. A wind turbine as claimed in claim 1, wherein the spring means comprises a non-metallic elastomeric material.

6. A wind turbine as claimed in claim 1, wherein the dihedral angle between adjacent vanes is 45°.

7. A wind turbine as claimed in claim 1, wherein the doors are pivotally attached about a substantially vertical axis.

8. A wind turbine as claimed in claim 1, wherein the spring means extends from a support structure to the counterweight.

9. A wind turbine as claimed in claim 1, wherein each door is pivotally attached about a substantially vertical axis and positioned between upper and lower substantially horizontal arms, said arms having means for preventing movement of each door in one direction.

10. A wind turbine as claimed in claim 9, wherein said means for preventing movement of each door comprises at least one pin extending from each arm toward each door for a sufficient distance from each arm to ensure solid contact with each door.

11. A wind turbine as claimed in claim 1, wherein the auxiliary panels each have a width dimension not exceeding approximately one fourth that of the height of each door.

12. A wind turbine as claimed in claim 1, wherein the means for restricting movement of the auxiliary panels comprises a cable connected at each end to a wheel, and each wheel being tangentially affixed to the plane of a panel.

13. A wind turbine as claimed in claim 1, further comprising release means for each door in the closed position, said means comprising spring loaded pins in the arms of each wing being automatically retractable by centrifugal means when the speed of rotation of the turbine exceeds a threshhold level, the retraction of said pins allowing the doors to open when the wings move with the wind thereby venting the force of the wind.

14. A wind turbine as claimed in claim 13, wherein each pin upon retraction coacts with means in each door defining an aperture and a pin resetting structure, each aperture being of sufficient size to allow the pin to pass therethrough, and said resetting structure being located on the wind receiving side of the door adjacent each aperture so as to engage the pin and guide it through the aperture as the speed of the turbine is reduced and the doors swing back to their normal operating positions.

15. A wind turbine as claimed in claim 14, wherein each said pin resetting structure comprises a wedge having a surface projecting outwardly from the plane of the door, which surface coacts with the pin when the door swings back toward the closed position to cause the pin to move through the aperture and back in place before the door.

16. A wind turbine as claimed in claim 13, wherein the centrifugal means comprises a lever hingedly attached to the shaft and rotatable therewith, said lever having a weight affixed to the end thereof and the weighted lever being biased inwardly toward the shaft by a spring, a cable being connected at one end to the lever and at the other end to said spring loaded pins so that when the centrifugal force on the weighted lever causes it to move away from the shaft in opposition to said springs, the pins are pulled toward their retracted position.

17. A wind turbine as claimed in claim 16, wherein said cable is branched and coacts with a plurality of pulleys so as to operate spring loaded pins on a plurality of wings.

* * * * *